United States Patent [19]

Ruff et al.

[11] Patent Number: 4,894,094
[45] Date of Patent: Jan. 16, 1990

[54] DISAZO COMPOUNDS AND FORMULATIONS CONTAINING SAME

[75] Inventors: Wolfgang Ruff, Stuttgart; Egon Liedek, Esslingen; Gerhard Berger, Stuttgart; Hans W. Sonneborn, Schwaebisch Gmuend, all of Fed. Rep. of Germany

[73] Assignee: Basf Lacke & Farben Aktiengesellschaft, Muenster, Fed. Rep. of Germany

[21] Appl. No.: 86,780

[22] Filed: Aug. 19, 1987

[30] Foreign Application Priority Data

Sep. 5, 1986 [DE] Fed. Rep. of Germany ....... 3630278

[51] Int. Cl.$^4$ ............................................ C09B 35/037
[52] U.S. Cl. ..................................... 106/496; 106/498; 534/747; 534/760; 534/573
[58] Field of Search ............... 534/740, 747, 760, 573; 106/288 Q, 496, 498

[56] References Cited

U.S. PATENT DOCUMENTS

| | | | |
|---|---|---|---|
| 3,361,736 | 1/1968 | Ribka | 8/639 |
| 3,529,984 | 9/1970 | Bandel et al. | 106/494 |
| 3,759,731 | 9/1973 | Kühne et al. | 8/641 |
| 3,775,148 | 11/1973 | Bradley | 106/496 |
| 3,776,749 | 12/1973 | McKay et al. | 106/496 |
| 4,602,960 | 7/1976 | Liedek et al. | 106/496 |
| 4,720,304 | 1/1988 | Ruff et al. | 106/496 |

FOREIGN PATENT DOCUMENTS

| | | | |
|---|---|---|---|
| 3109579 | 10/1982 | Fed. Rep. of Germany | 534/740 |
| 1111050 | 4/1968 | United Kingdom. | |

OTHER PUBLICATIONS

*Organic Chemistry*, 3rd Edition, by James B. Hendrickson, pp. 159–165, 215, 328, 329, 797, 798.

Primary Examiner—Paul Lieberman
Assistant Examiner—Christine A. Skane
Attorney, Agent, or Firm—Oblon, Spivak, McClelland, Maier & Neustadt

[57] ABSTRACT

Disazo compounds based on 4,4'-diaminodiphenyl compounds contain not less than 50% by weight of a disazo compound of the general formula $$A-N=N-Z-N=N-B \qquad (I)$$

where Z is a radical of an unsubstituted of symmetrically substituted diphenylene, A is a radical of a coupling component of a 1-phenylpyrazolone or of an acetoacetarylide, where the phenyl and the aryl radical is substituted by sulfo or carboxyl groups, and B is a radical of a coupling component based on 1-phenylpyrazolone or acetoacetarylide, which are free of sulfo and/or carboxyl groups.

The disazo compounds can be obtained by coupling the tetrazotized diamine $H_2N-Z-NH_2$ to the coupling component AH containing an acidic group in a medium containing a mineral acid, and then coupling the product to BH in a buffered medium (pH about 4).

The novel disazo compounds are suitable as additives to pigments, in particular azo and disazo pigments, for improving the transparency and heat stability of the pigment particles, and the flow behavior.

22 Claims, No Drawings

DISAZO COMPOUNDS AND FORMULATIONS CONTAINING SAME

BACKGROUND OF THE INVENTION

It is known that the properties of pigments can be improved by adding additives which have a similar composition to these pigments. By means of such additives, the coloristic properties, such as color strength, transparency and gloss, are improved when the pigments are used in printing inks.

In the case of disazo pigments, such pigment/additive mixtures can be prepared directly during synthesis by crosscoupling to a mixture of the coupling components (DE-B 15 44 507, 12 89 931 and 15 44 534).

Crosscoupling to pigment mixtures where a mixture of the neutral coupling component and a small amount of a coupling component containing an acidic group is used as the coupling component is also known (DE-A 20 12 152).

The preparation of mixtures of pigments and constitutionally similar compounds which carry acidic groups by crosscoupling a tetrazotized mixture of a 4,4'-diaminodiphenyl and a compound which contains an acidic group and 2 diazotizable amino groups, such as 4,4'-diaminodiphenyldisulfonic acid or 4,4'-diaminostilbenedisulfonic acid, to acetoacetarylides, 1-arylpyrazolones or naphthol-AS components is also known (DE-C 21 22 521 and DE-A 33 29 846).

In another variant for improving the pigment properties, the pigments are mixed with additives which are not constitutionally similar to the pigments to be improved (DE-A 34 34 379).

According to the literature, these additives improve the performance characteristics of the pigments, such as color strength, gloss, heat stability, dispersibility and flow behavior in binders.

Recently, pigments having a high resin content have preferably been used for printing progressive yellow proofs, the resin content of the said pigments being 40% by weight or higher. These resin-containing pigments are distinguished in particular by high transparency and, in spite of the high resin content, by a very high color strength and excellent gloss and dispersion behavior. These pigments with a high resin content have the disadvantage that, when they are milled in modern dispersing machines, for example in high speed stirred ball mills, the color strength and the transparency decrease. This is a consequence of the crystallization of the pigments as a result of the temperature increase which occurs during milling.

SUMMARY OF THE INVENTION

It is an object of the present invention to provide disazo compounds which are suitable as additives for stabilizing azo pigments, in particular disazo pigments.

We have found that this object is achieved, and that disazo compounds suitable as such additives are obtained, if the said disazo compounds are asymmetric and one of the coupling components carries an acidic group.

DETAILED DESCRIPTION OF THE PREFERRED EMBODIMENTS

Accordingly, the present invention relates to disazo compounds based on 4,4'-diaminodiphenyl compounds, which contain not less than 50% by weight of a disazo compound of the general formula $$A-N=N-Z-N=N-B \quad (I)$$

where Z is

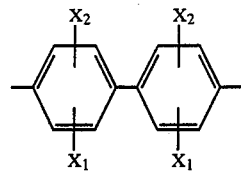

where $X_1$ and $X_2$ independently of one another are each hydrogen, chlorine, bromine, methoxy or methyl and are arranged symmetrically, A is a radical of the coupling component

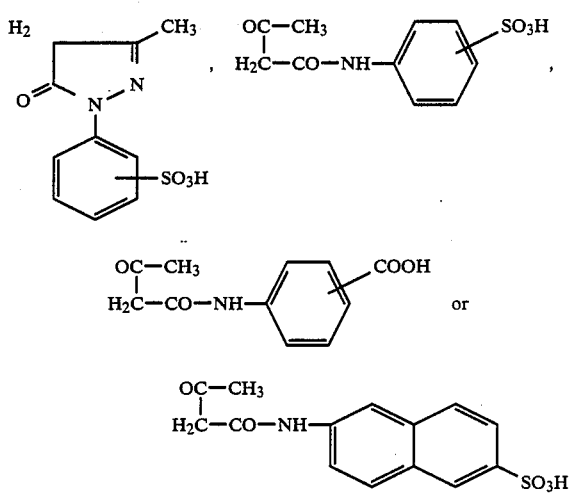

where the benzene radicals and the naphthalene radical are not further substituted or are additionally monosubstituted or disubstituted by chlorine, methyl and/or methoxy, and B is a radical of a coupling component

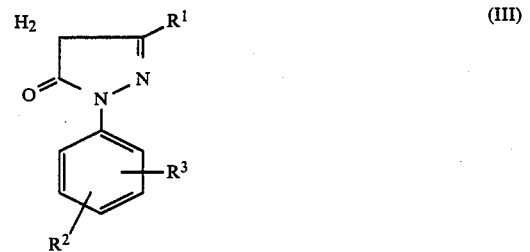

(III)

or

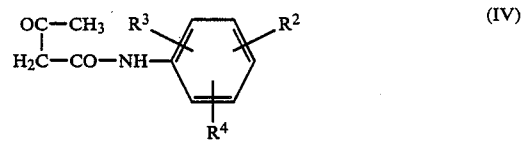

(IV)

where $R^1$ is methyl or carbo-$C_1$-$C_4$-alkoxy and $R^2$, $R^3$ and $R^4$ independently of one another are each hydrogen, methyl, methoxy or chlorine.

When added in an amount of from 0.5 to 20% by weight to azo, in particular disazo, pigments having a high resin content, the novel disazo compounds not only substantially improve the coloristic properties but also decisively improve the heat stability. This positive effect is also achieved in the case of the pigments having a lower resin content and in the resin-free pigments. However, the effect is particularly striking in the case of the pigments with a high resin content, owing to their high transparency. The action of the disazo compounds (I) is substantially superior to that of the conventional additives.

Suitable disazo compounds (I) are those derived from diamines of the formula

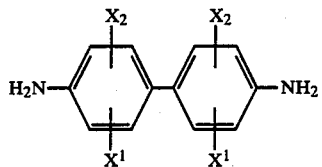

In the formula, $X^1$ and $X^2$ independently of one another are each hydrogen, chlorine, bromine, methoxy or methyl, $X_1$ and $X_2$ being arranged symmetrically.

Specific examples of diamines (II) are 4,4'-diaminodiphenyl, 4,4'-diamino-3,3'-dichlorodiphenyl, 4,4'-diamino-3,3'-dibromodiphenyl, 4,4'-diamino-3,3'-dimethoxydiphenyl, 4,4'-diamino-3,3'-dimethyldiphenyl, 4,4'-diamino-3,3',5,5'-tetrachlorodiphenyl, 4,4'-diamino-2,2',5,5'-tetrachlorodiphenyl and 4,4'-diamino-3,3'-dichloro-5,5'-dibromodiphenyl.

Preferred disazo compounds (I) are those derived from 4,4'-diamino-3,3'-dichlorodiphenyl, 4,4'-diamino-3,3'-dimethoxydiphenyl, 4,4'-diamino-3,3'-dimethyldiphenyl, 3,3',5,5'-tetrachloro-4,4'-diaminodiphenyl or 2,2',5,5'-tetrachloro-4,4'-diaminodiphenyl. Among these, the compounds (I) where 4,4'-diamino-3,3'-dichlorodiphenyl is a diazo component are particularly preferred.

Specific examples of coupling components A-H are 1-sulfophenyl)-3-methylpyrazol-5-one and acetoacetsulfoanilide, where the sulfo groups are in the 2-, 3- or 4-position on the phenyl radical, and the phenyl radicals may be substituted by 1 or 2 chlorine atoms, by methyl or by chlorine and methyl, and acetoacet-6-sulfonaphthyl-2-amide and acetoacetcarboxanilide, where the carboxyl group may be in the 2-, 3- or 4-position. Specific examples of the coupling component AH are 1-(3-sulfophenyl)-3-methylpyrazol-5-one, 1-(4-sulfophenyl)-3-methylpyrazol-5-one, 1-(2-chloro-4-sulfophenyl)-3-methylpyrazol-5-one, 1-(2-chloro-5-sulfophenyl)-3-methylpyrazol-5-one, 1-(2,5-dichloro-4-sulfophenyl)-3-methylpyrazol-5-one, acetoacetaminobenzene-3- and -4-sulfonic acid, acetoacetamino-4-methylbenzene-2-sulfonic acid, acetoacetamino-4-methyl-5-chlorobenzene-2-sulfonic acid, acetoacetamino-4-chloro-5-methylbenzene-2-sulfonic acid, acetoacetaminobenzene-3- and -4-carboxylic acid. Among the stated coupling components, the 3- and 4-sulfophenylpyrazolones and the acetoacetaminobenzene-3- and -4-sulfonic acids are preferred.

Suitable coupling components B-H are those of the formulae (III) and (IV), from the series consisting of 1-phenylpyrazol-5-one and acetoacetanilide.

Specific examples of BH are acetoacetanilide, acetoacet-o-toluidide, acetoacetamino-2,4-dimethylbenzene, acetoacetamino-2,5-dimethoxy-4-chlorobenzene, acetoacetamino-2-methoxybenzene, 1-phenyl-3-methylpyrazol-5-one, 1-(4'-methylphenyl)-3-methylpyrazol-5-one and 1-phenyl-3-carboethoxypyrazol-5-one.

Particularly preferred components BH are acetoacetanilide and the coupling components (IV) derived therefrom.

Specific examples of disazo compounds (I) are

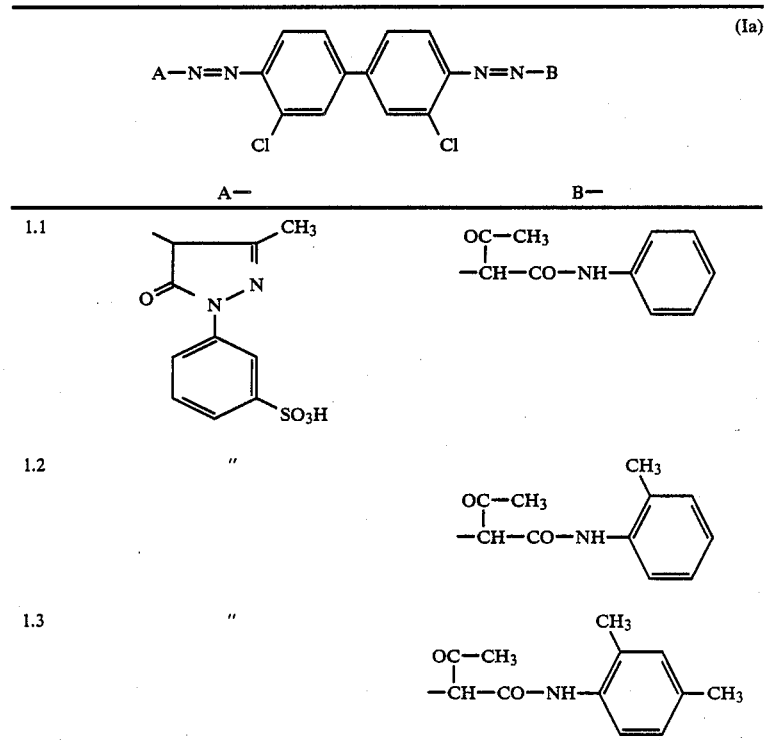

-continued
| | | |
|---|---|---|
| 1.4 | " | 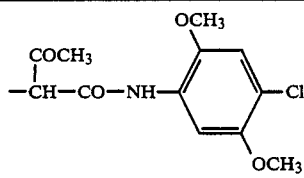 |
| 1.5 | " | 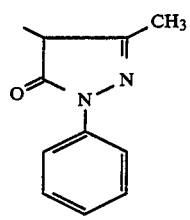 |
| 1.6 | " | 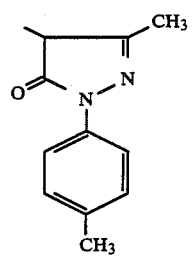 |
| 1.7 | " | 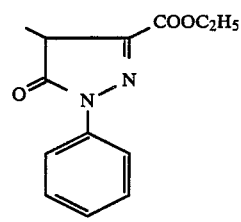 |
| 1.10 | 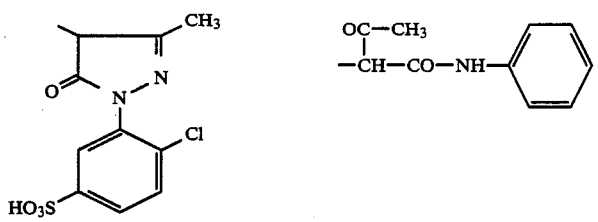 | |
| 1.11 | " | 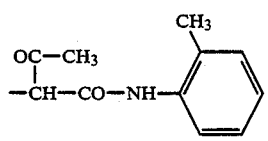 |
| 1.12 | " | 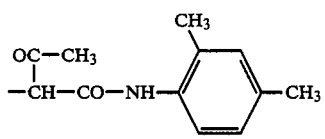 |
| 1.13 | " | 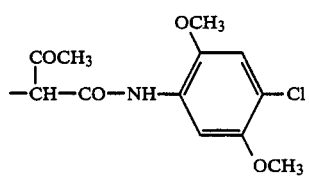 |

| | | |
|---|---|---|
| 1.14 | " | 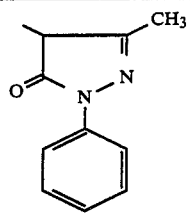 |
| 1.15 | " | 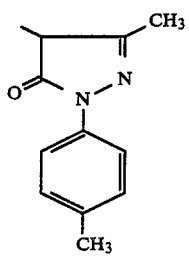 |
| 1.16 | " | 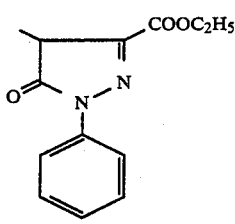 |
| 2.1 | 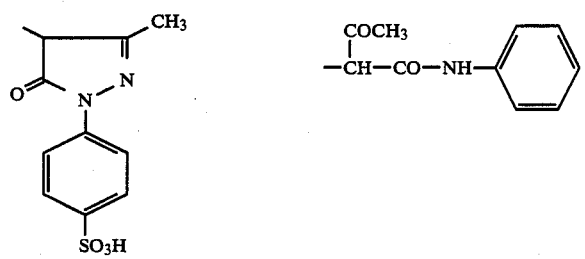 | |
| 2.2 | " | 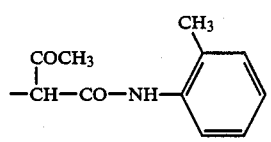 |
| 2.3 | " | 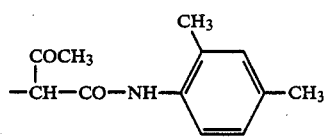 |
| 2.4 | " | 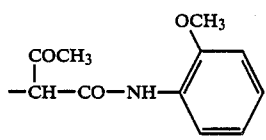 |
| 2.5 | " | 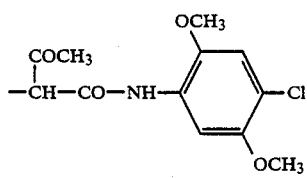 |

-continued
| 2.6 | " | 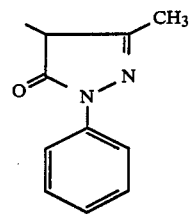 |
| 2.7 | " | 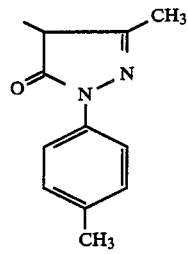 |
| 2.8 | " | 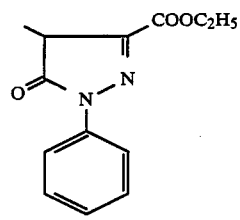 |
| 2.10 | 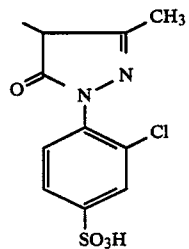 | 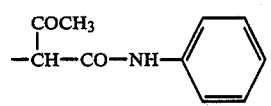 |
| 2.11 | " | 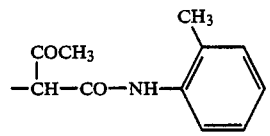 |
| 2.12 | " | 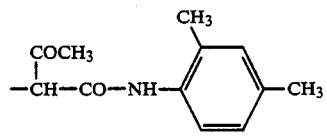 |
| 2.13 | " | 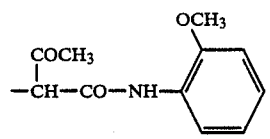 |
| 2.14 | " | 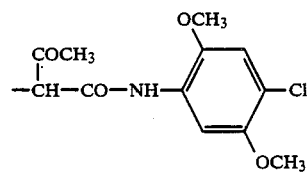 |

-continued
| | | |
|---|---|---|
| 2.15 | " | 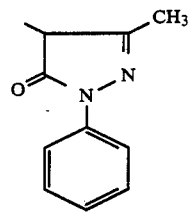 |
| 2.16 | " | 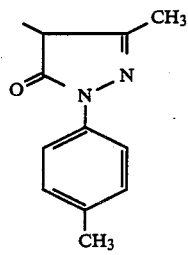 |
| 2.17 | " | 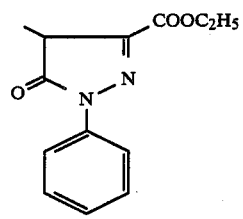 |
| 2.20 | 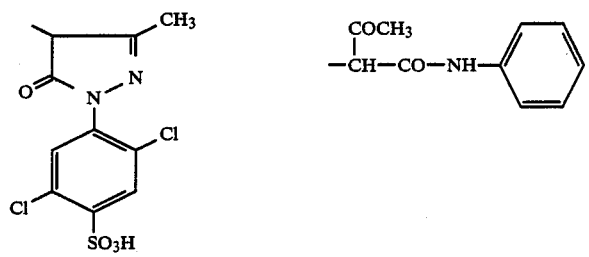 | |
| 2.21 | " | 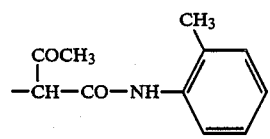 |
| 2.22 | " | 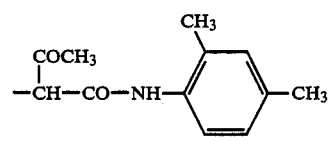 |
| 2.23 | " | 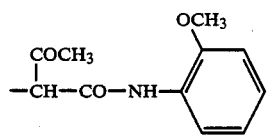 |
| 2.24 | " | 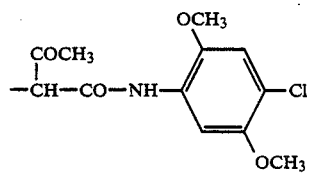 |

-continued
| | | |
|---|---|---|
| 2.25 | " | 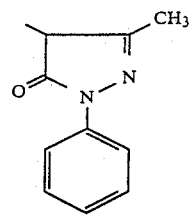 |
| 2.26 | " | 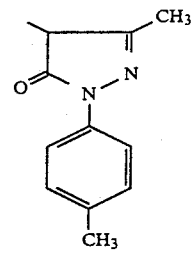 |
| 2.27 | " | 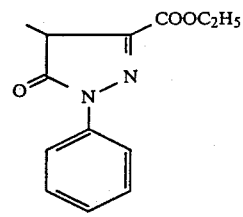 |
| | A | B |
|---|---|---|
| 3.1 | 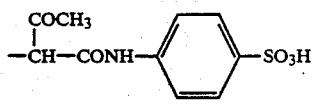 | 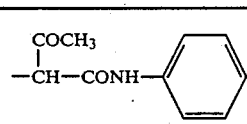 |
| 3.2 | " | 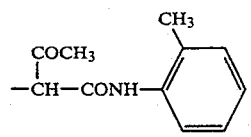 |
| 3.3 | " | 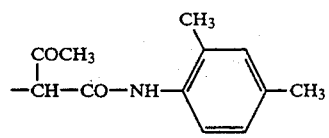 |
| 3.4 | " | 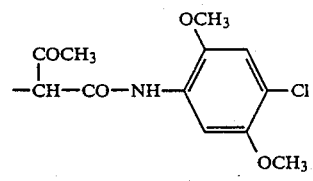 |
| 3.5 | " | 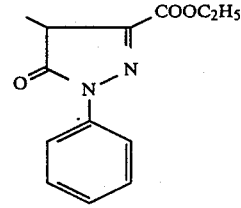 |

-continued
| | | |
|---|---|---|
| 3.6 | " | 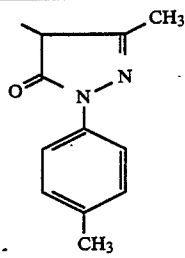 |
| 3.7 | " | 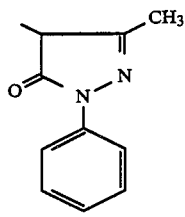 |
| 4.1 | 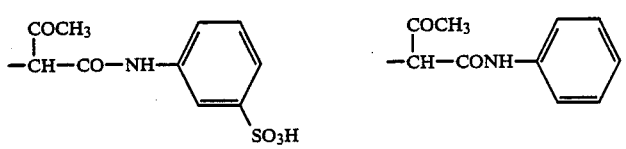 | |
| 4.2 | " | 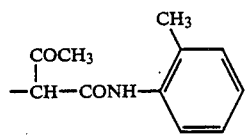 |
| 4.3 | " | 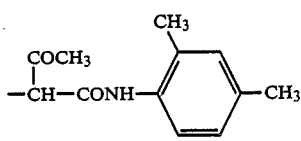 |
| 4.4 | " | 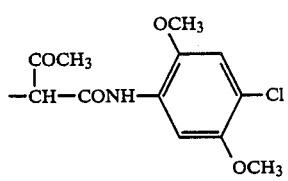 |
| 4.5 | " | 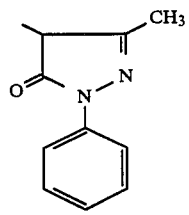 |
| 4.6 | 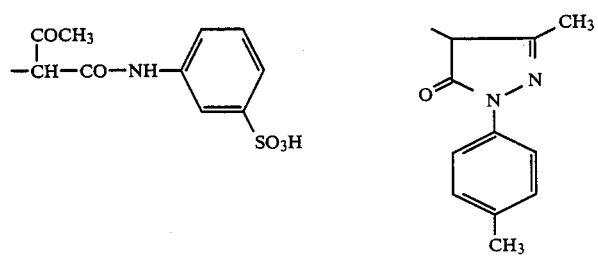 | |

-continued
| | | |
|---|---|---|
| 4.7 | " | 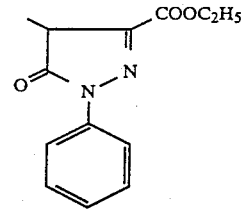 |
| 5.1 | 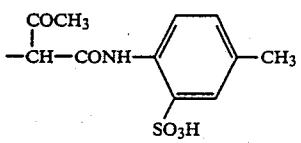 | 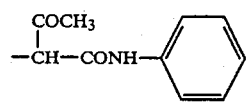 |
| 5.2 | " | 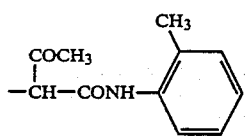 |
| 5.3 | " | 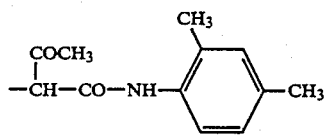 |
| 5.4 | " | 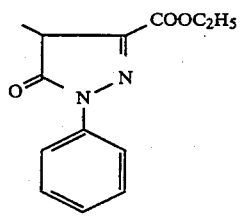 |
| 5.5 | " | 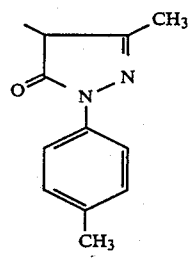 |
| 5.6 | " | 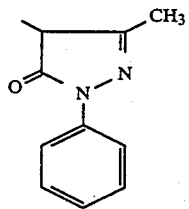 |
| 5.10 | 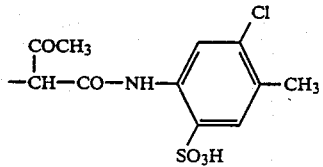 | 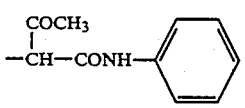 |

-continued
| 5.11 | " | 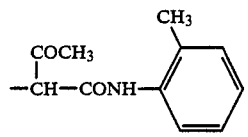 |
| 5.12 | " | 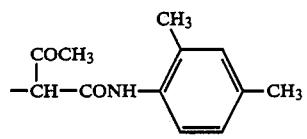 |
| 5.13 | " | 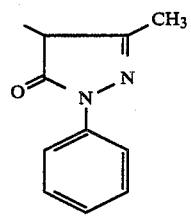 |
| 5.14 | " | 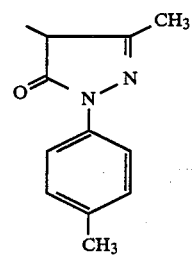 |
| 5.15 | " | 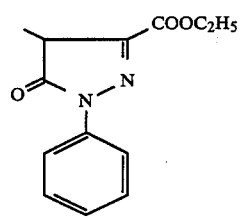 |
| 5.20 | 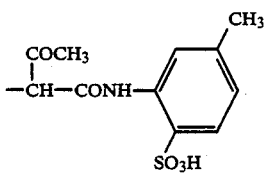 | 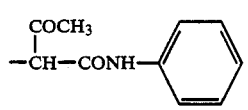 |
| 5.21 | " | 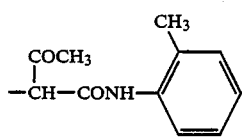 |
| 5.22 | " | 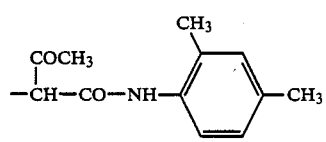 |

-continued
| | | |
|---|---|---|
| 5.23 | " | 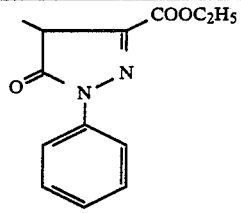 |
| 5.24 | 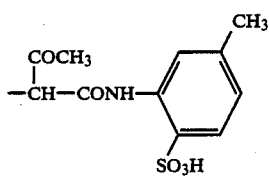 | 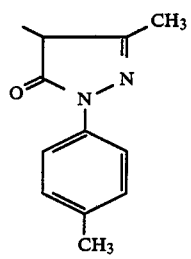 |
| 5.25 | " | 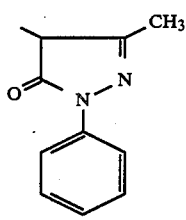 |
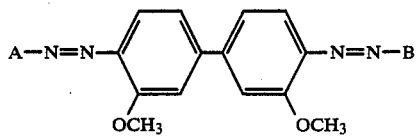 (Ib)
| A— | B— |
|---|---|
| 6.1 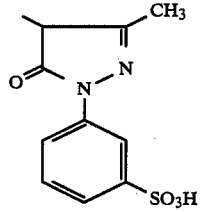 | 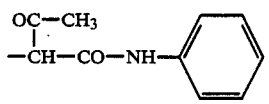 |
| 6.2 " | 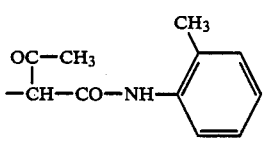 |
| 6.3 " | 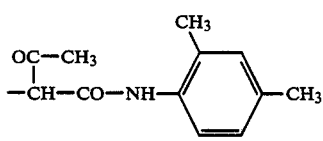 |
| 7.1 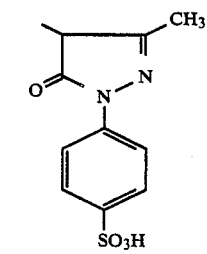 | 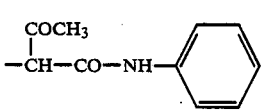 |

| | | |
|---|---|---|
| 7.2 | " | 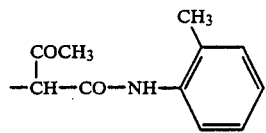 |
| 7.3 | " | 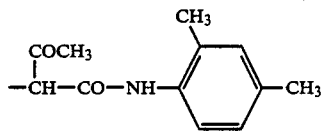 |
| 8.1 | 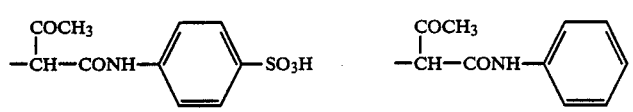 | 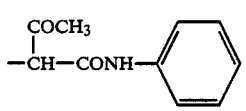 |
| 8.2 | " | 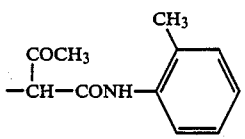 |
| 8.3 | " | 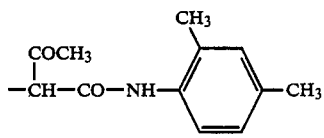 |
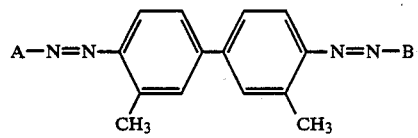 (Ic)
| | A— | B— |
|---|---|---|
| 9.1 | 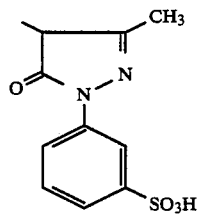 | 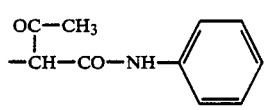 |
| 9.2 | " | 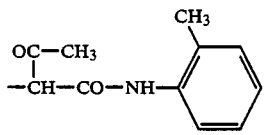 |
| 9.3 | " | 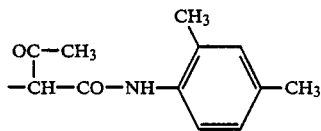 |

-continued
| | | |
|---|---|---|
| 10.1 | 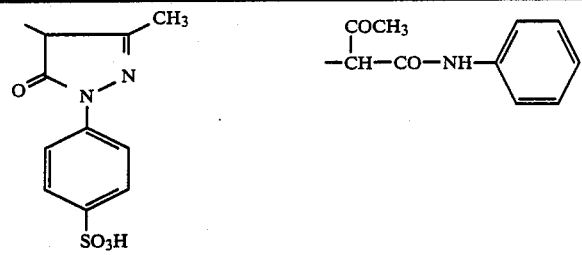 | |
| 10.2 | " | 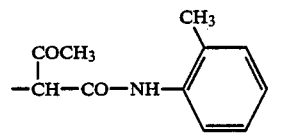 |
| 10.3 | " | 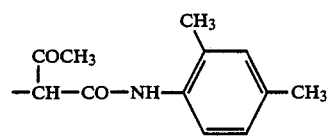 |
| 11.1 | 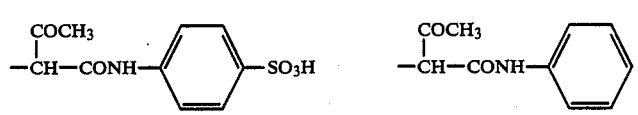 | |
| 11.2 | " | 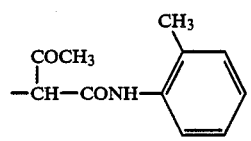 |
| 11.3 | 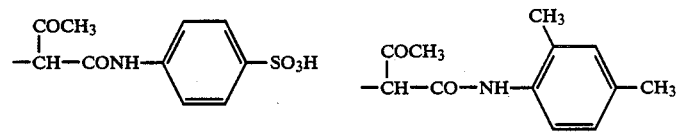 | |
| 12.1 | 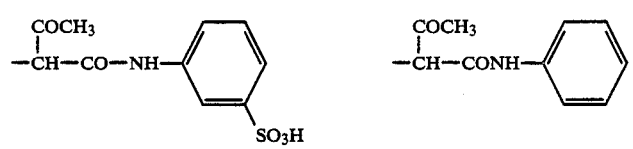 | |
| 12.2 | " | 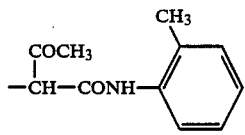 |
| 12.3 | " | 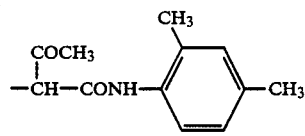 |
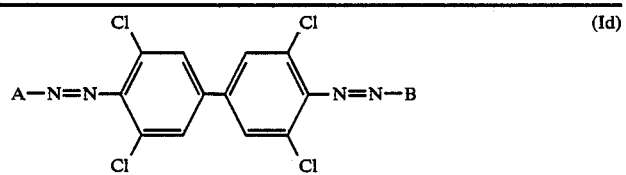
(Id)
A—                                B—

-continued
| | | |
|---|---|---|
| 13.1 | 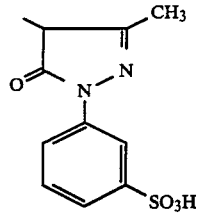 | 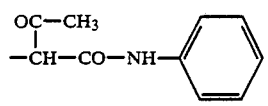 |
| 13.2 | " | 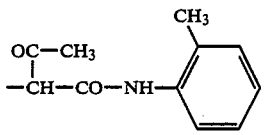 |
| 13.3 | " | 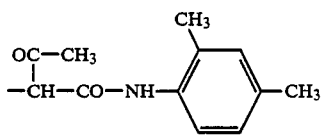 |
| 14.1 | 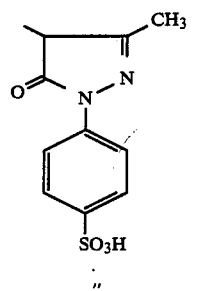 | 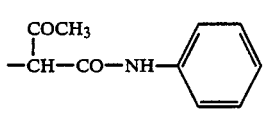 |
| 14.2 | " | 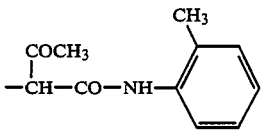 |
| 14.3 | " | 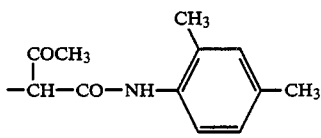 |
| 15.1 | 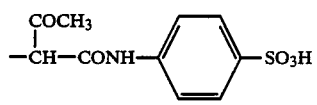 | 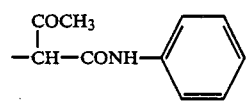 |
| 15.2 | " | 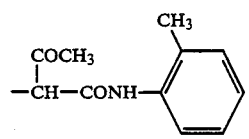 |
| 15.3 | " | 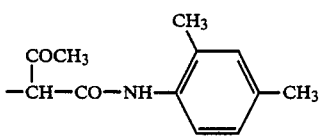 |
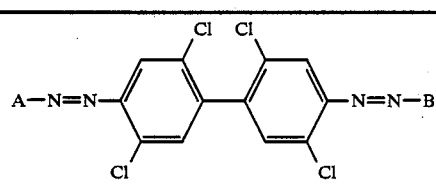
(Ie)

-continued

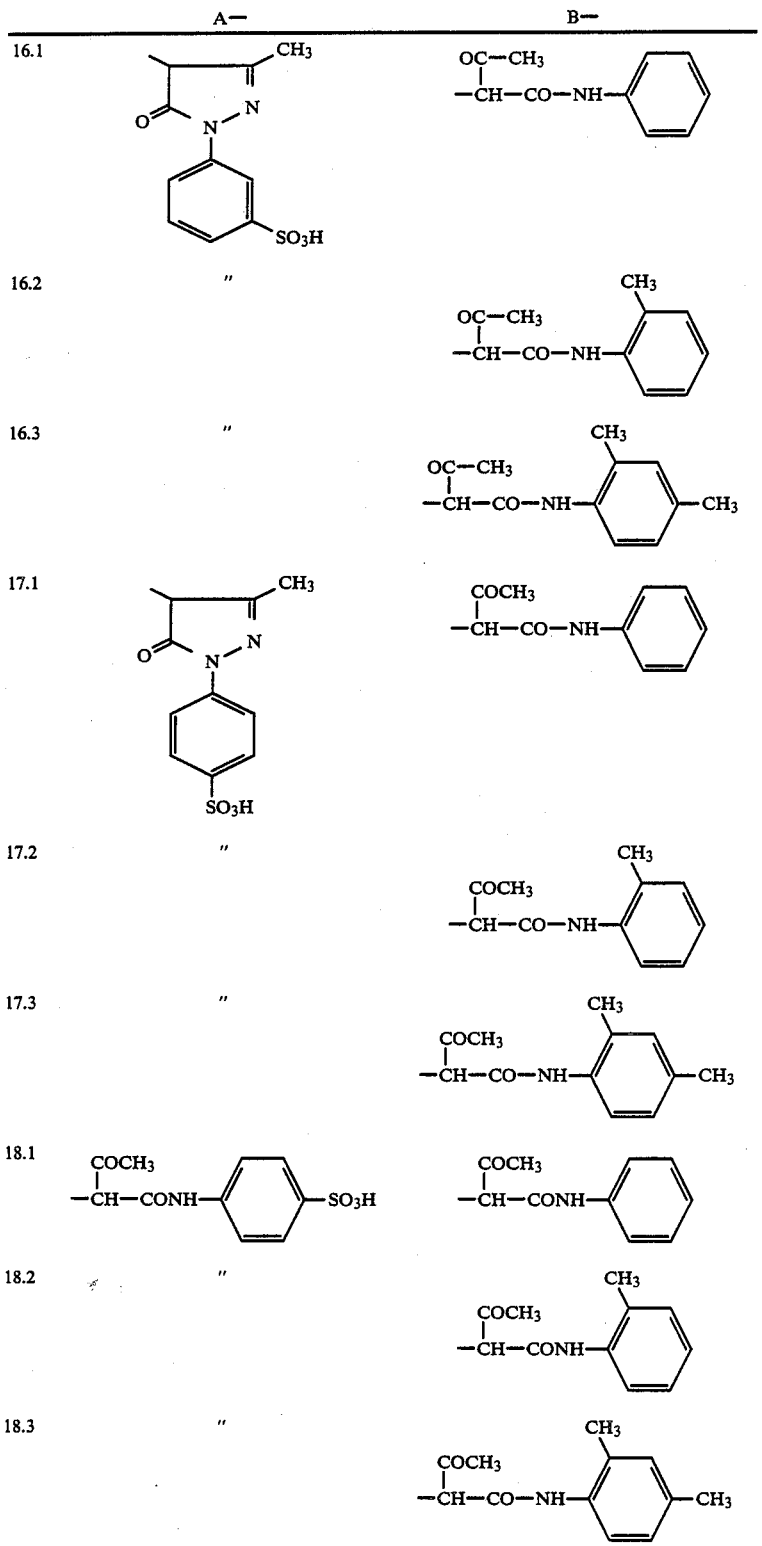

Among the abovementioned disazo compounds, those of the formula (Ia) stated under 1.1 to 1.3, 2.1 to 2.3, 3.1 to 3.3 and 4.1 to 4.3 are particularly noteworthy since they have an especially high stabilizing effect.

The disazo compounds (I) are prepared by coupling, in principle similarly to the process described in French Patent 1,002,512. In this process, an alkaline solution of the coupling component AH which carries an acidic group, is added to a mineral acid-containing solution of the tetrazotized diamine of the formula $H_2N-Z-NH_2$, where Z has the above meanings, in an amount of 1 mole of the said alkaline solution per mole of the said tetrazotized diamine, and the resulting mixture must contain the mineral acid. This suspension which contains mineral acid and, after the addition of AH, contains diazonium salt essentially coupled at one end is then slowly buffered to about pH 4, after which about 1 mole of an alkaline solution of the coupling component BH is added, essentially the asymmetric disazo compound (I) being formed.

For the selective synthesis of the asymmetric disazo compounds (I), it is critical that, in the first stage, coupling of the tetrazotized diamine with the coupling components AH containing the acidic group in a molar ratio of 1:1 in the solution containing mineral acid takes place with formation of a monoazo-diazonium compound $$A-N=N-Z-N_2^{\oplus}$$

which is sparingly soluble in the reaction medium. When the coupling in the first stage is complete, $\beta$-naphthol gives only a weak color reaction with unreacted bisdiazotized diamine in the outflowing liquid phase of a drop of the suspension applied to filter paper. After 5% of the amount of BH required for the second stage has been added to the suspension buffered to pH 4, no further color reaction with $\beta$-naphthol occurs in the outflow.

Coupling with B-H to give the asymmetric disazo compound (I) then takes place in the subsequent second stage.

The second reaction step, ie. coupling of the azodiazonium salt to BH, can also be carried out by a method in which the diazonium salt coupled at one end is added to an initially taken buffered suspension of the component BH whose pH has been brought to 4–5, this suspension containing sufficient buffer to prevent the pH of the reaction mixture from falling below 4 after the addition of the suspension containing mineral acid. In another possible procedure, the pH of the initially taken suspension of BH is kept at from 4 to 5 by the simultaneous addition of buffer solution.

In another variant for the selective synthesis of the asymmetric disazo compound (I), 1 mole of the coupling component AH is reacted with more than 1 mole, eg. 2–3 moles, of the tetrazotized diamine (II) in the abovementioned manner in the first stage. The resulting mineral acid-containing suspension which, in addition to the excess of tetrazonium salt, contains the azodiazonium salt $A-N=N-Z-N_2^{\oplus}$ is then coupled to BH by adding it to a suspension of the coupling component BH which has been buffered to pH 4. This variant too gives essentially the asymmetric disazo compound (I), in addition to the symmetric $B-N=N-Z-N=N-B$ (V).

In the last-mentioned variant, the pigment formulations containing (I) can be prepared in a single-vessel reaction. To do this, the component BH dissolved in an alkaline medium and the mineral acid-containing solution of the tetrazotized diamine (II) are added simultaneously to the suspension obtained when the coupling of the second stage is complete, the pH being kept at 4–5.

To prepare the pigment formulations containing (I), the coupling of the 1st stage to give the azodiazonium compound $A-N=N-Z-N_2^{\oplus}$ can be carried out in a large excess of tetrazonium salt. The resulting mixture of tetrazonium salts and $A-N=N-Z-N_2^{\oplus}$ is then coupled to BH in a conventional manner, for example as described in the two variants stated above.

In the coupling variants described above, the asymmetric disazo compound (I) is obtained in a high yield, with or without the pigment $B-N=N-Z-N=N-B$. The amount of any symmetric disazo compound $A-N=N-Z-N=N-A$ present is less than 20% by weight, based on (I).

As a rule, the process gives disazo compounds containing $\geq 50$, preferably $\geq 80$, % by weight of the asymmetric disazo compound (I), ie. the resulting disazo compounds contain less than 50, preferably less than 20, % by weight, based on (I), of the symmetric disazo compound having 2 coupling components which carry an acidic group ($A-N=N-Z-N=N-A$).

Particularly preferred disazo compounds are those containing $\geq 80\%$ by weight of (I), since these disazo compounds have a particularly high stabilizing effect on pigments.

The fact that this process predominantly or essentially gives asymmetric disazo compounds can be demonstrated by, for example, thin layer chromatography. In the resulting thin layer chromatograms, the main fractions have $R_f$ values which differ from those of the symmetric disazo compounds $A-N=N-Z-N=N-A$ and $B-N=N-Z-N=N-B$ prepared separately.

HPLC analysis of the product obtained by the abovementioned process from 1 mole of tetrazotized 4,4'-diamino-3,3'-dichlorodiphenyl, 1 mole of 1-(3'-sulfophenyl)-3-methylpyrazol-5-one as AH and 1 mole of acetoacet-2,4-xylidide as BH indicated the presence of the compounds

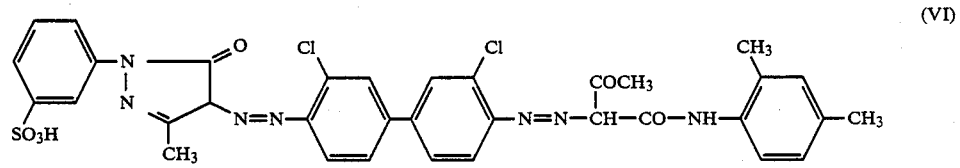

(VI)

and

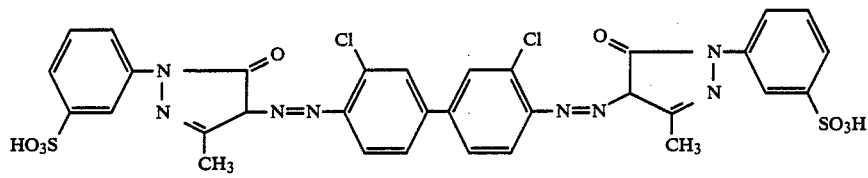

(VII)

in a weight ratio of 98.3:1.7.

The coupling component (VIII) obtained from tetrazotized 4,4'-diamino-3,3'-dichlorodiphenyl with 2 moles of acetoacet-2,4-xylidide was sparingly soluble and therefore impossible to detect in the HPLC chromatogram. Because of the stoichiometry, this compound must be formed in the same molar amount as (VII).

Accordingly, the weight ratio of (VI) to (VII) of 98.3:1.7 gives a molar ratio of (VI) to (VII) to (VIII) of 96.8:1.6:1.6 or a weight ratio of (VI) to (VII) to (VIII) of 96.9:1.7:1.4.

If the coupling in both the first stage and the second stage is carried out in a medium buffered at pH 4.5 or in a neutral medium, mixtures of disazo compounds containing a substantially smaller amount of (I) are obtained, this amount being less than 50% by weight, based on the mixture.

If, on the other hand, the coupling is carried out in the reverse order, ie. first the coupling to the neutral coupling component BH in a medium containing mineral acid and then the coupling to AH in the buffered medium, the resulting mixtures contain about 50% by weight of the symmetric disazo compound possessing the coupling components carrying acidic groups. These products are not sufficiently effective for stabilizing pigments.

The novel disazo compounds are very useful as additives to pigments, preferably to azo, in particular disazo, pigments, for improving their transparency and stability to recrystallization, in particular in printing inks.

For this application, in general from 0.5 to 20, preferably from 1 to 5, % by weight, based on the pigment, of (I) or of the novel mixture containing (I) are added.

Compounds (I) which are particularly preferably added are those which possess, as the neutral coupling component BH, that of the pigment to be doped. For example, in the case of C.I. Pigment Yellow 12, C.I. No. 21,090, the disazo compound obtained by coupling with acetoacetanilide in the second stage is preferred. Similarly, advantageous effects are obtained for C.I. Pigment Yellow 13, C.I. 21,100, with novel disazo compounds which have been coupled with acetoacet-2,4-xylidide in the 2nd stage. The same also applies to C.I. Pigment Yellow 14, C.I. No. 21,095.

An improvement in the transparency coupled with very high heat stability is achieved not only in the case of pure diarylide pigments but also with diarylide pigments prepared by crosscoupling 3,3'-dichloro-4,4'-diaminodiphenyl with 2 different acetoacetarylides, for example crosscoupling with acetoacet-2,4-dimethylanilide and acetoacet-2-methoxyanilide. In the form having a high resin content, the addition of the novel disazo compound obtained from 3,3'-dichloro-4,4'-diaminodiphenyl with 1-(4-sulfophenyl)-3-methyl-pyrazol-5-one and acetoacet-2,4-dimethylanilide results in pigments which, when used in printing inks, give prints having excellent transparency coupled with very good heat stability. These advantageous properties are achieved both in the compositions in which the resin and the acidic additive are in the form of the free acids and those in which they are in the form of metal soaps, eg. Ca or Zn soaps. Which of the two possible forms is chosen depends in each case on the requirements which the flow behavior and other printing properties of the inks have to meet.

The novel disazo compounds can be added to the pigments at any point during pigment synthesis, for example to the suspension of the coupling component, to the solution of the diazotized diazo component or to the aqueous pigment suspension. In the case of the resin-containing pigments, the novel disazo compound can be added both before or after the addition of the resin and after the heat treatment in alkaline medium which is generally carried out in the case of pigments having a high resin content.

In specific cases, the introduction of the additive during dispersing of the pigment in the printing ink medium may furthermore lead to an improvement in the properties. However, the disazo compounds according to the invention are preferably added during or directly after the pigment synthesis in an aqueous medium. Which of the stated methods gives the best results can be determined by simple experiments.

The Examples which follow illustrate the invention. Parts and percentages are by weight. Parts by volume bear the same relation to parts by weight as that of the liter to the kilogram.

A. Testing the pigment formulations

1. Dispersing:

The pigments were milled in a letterpress/offset printing varnish (pigment content 15%) on an Engelsmann disk mill or a three-roll mill (roll temperature 50° C.) (ink 1).

2. Testing the transparency and heat stability:

One part of ink 1 is stored for 2 hours at 100° C. in a drying oven (ink 2).

The two inks are used to produce prints having the same film thickness (about 1.3 g/m$^2$) on standard paper on which a strip has been printed with black ink, printing being carried out on a printability tester from Prufbau.

The ink densities of the colored prints over the black printed field are measured using a type D 142-3 reflecting densitometer from Gretag, with an inserted filter for black. The densitometer, which is calibrated over the black field which has not been overprinted (setting to zero display), always indicates negative ink densities since the colored ink printed on top reduces the high optical density of the black print.

The smaller the deviation from the value of zero set for black, the more transparent is the colored ink printed on top. Since heating the ink generally causes the transparency to decrease as a result of crystal growth of the pigment particles, the ink density of the print (=ink density D1) produced with the ink which has not been heated (ink 1) is closer to 0 than the ink density of the print (=ink density D2) produced with the corresponding ink heated to 100° C. (ink 2).

The smaller the difference between D1 and D2, the more heat-stable is the pigment. The heat sensitivity number HSN is defined as a measure of the heat stability:

$$HSN = (D1 - D2) \cdot 100$$

To assess a transparent pigment, it is necessary to consider D1 and HSN, the pigment being considered the more advantageous the closer D1 is to 0, ie. the more transparent the pigment, and the smaller HSN, ie. the more heat-stable the pigment.

Visual evaluation of the prints provides further information about the transparency and heat stability of the pigments, the results of this evaluation being in good agreement with the measured values. B. Preparation of the disazo compounds

EXAMPLE 1

4,4'-Diamino-3,3'-dichlorodiphenyl→1-(3'-sulfophenyl)-3-methylpyrazol-5-one→acetoacet-2,4-dimethylanilide.

Solution 1a 25.32 parts of 4,4'-diamino-3,3'-dichlorodiphenyl in 1,200 parts by volume of 0.5N hydrochloric acid are tetrazotized with 13.95 parts of sodium nitrite in a conventional manner.

Solution 1b 25.43 parts of 1-(3'-sulfophenyl)-3-methylpyrazol-5-one are dissolved in 251 parts by volume of 0.4N sodium hydroxide solution (temperature=20° C.).

Solution 1c 50.5 parts of sodium acetate.3H$_2$O are dissolved in 250 parts by volume of water.

Solution 1d 22.6 parts of acetoacet-2,4-dimethylanilide are dissolved in 291 parts by volume of 0.4N sodium hydroxide solution (temperature=20° C.).

Solution 1b is added dropwise in the course of 20 minutes at from 0° to 5° C. to solution 1a, while stirring and cooling. The resulting suspension containing mineral acid is buffered to pH 4.0 by slowly adding solution 1c. Thereafter, solution 1d is added to the reaction mixture in the course of 20 minutes without further cooling, the pH of the mixture being 4.5 after the addition. After about 5% of solution 1d has been added, the filter paper test with β-naphthol shows that the reaction mixture no longer contains any dissolved tetrazonium salt.

The suspension is then heated to 50° C. and stirred at this temperature for 1 hour.

The reaction product is filtered off and dried at 50° C. The yield of the crude product is 72.36 parts.

Quantitative investigation of the crude product by high pressure liquid chromatography indicates a content of 98% of asymmetric disazo compound.

The suspension obtained in the synthesis can be used as a pigment additive. Purification of the crude product:

10 parts of the crude product are recrystallized from 650 parts by volume of dimethylformamide, 7.95 parts of the chromatographically pure asymmetric disazo compound

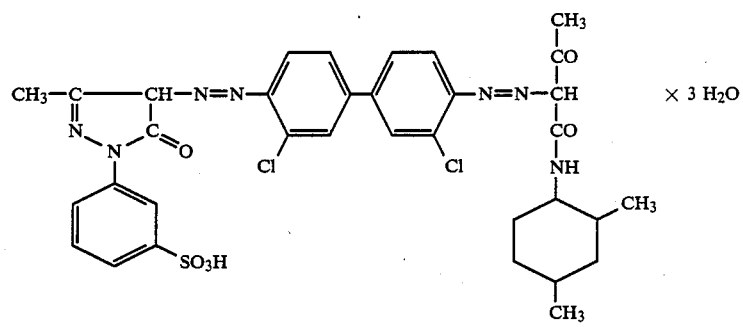

being isolated.

Analysis: C$_{34}$H$_{35}$N$_7$O$_9$Cl$_2$S

|  | C | H | N | Cl | S |
|---|---|---|---|---|---|
| calculated: | 51.8 | 4.5 | 12.4 | 9.0 | 4.1% |
| found: | 51.8 | 4.1 | 12.3 | 9.0 | 4.0% |

EXAMPLE 2

2.1 The solution (1b) from Example 1 is added dropwise in the course of 20 minutes at from 0° to 5° C. to solution (1a) from Example 1, while stirring and cooling.

Solution 2c 39.1 parts of acetic acid are mixed with 300 parts of water.

Solution 2d 22.6 parts of acetoacet-2,4-dimethylanilide are dissolved in 595 parts by volume of 1N sodium hydroxide solution.

2.2 Solution 2d is added at 20° C. to cooled solution 2c, the acetoacet-2,4-dimethylanilide being precipitated. The suspension obtained in 2.1 is added slowly to this suspension with thorough stirring, and the mixture is heated to 50° C. and stirred at this temperature for a further hour.

The disazo compound obtained in the suspension corresponds to that obtained according to Example 1.

EXAMPLE 3

Solution 3a 1.4 parts of 4,4'-diamino-3,3'-dichlorodiphenyl in 84 parts by volume of 0.5N hydrochloric acid are tetrazotized with 0.77 part of sodium nitrite in a conventional manner.

Solution 3b 0.144 part of 1-(3'-sulfophenyl)-3-methylpyrazol-5-one is dissolved in 5.7 parts by volume of 0.1N sodium hydroxide solution (temperture=20° C.).

Solution 3c 151 parts by volume of 0.5N acetic acid are initially taken in the coupling vessel.

Solution 3d 23.4 parts of acetoacet-2,4-dimethylanilide are dissolved in 159 parts by volume of 1.5N sodium hydroxide solution (temperature=20° C.).

3.1 Solution 3b is added dropwise in the course of 20 minutes at from 0° to 5° C. to solution 3a, while stirring and cooling.

3.2 Solution 3d is added to solution 3c in an amount sufficient to bring the pH to 5.0. The suspension containing mineral acid and obtained in 3.1 and an amount of the remaining solution 3d sufficient to keep the pH at 5 are then added simultaneously. In addition to the pigment formed from the excess of tetrazotized 4,4'-diamino-3,3'-dichlorophenyl, the asymmetric disazo compound

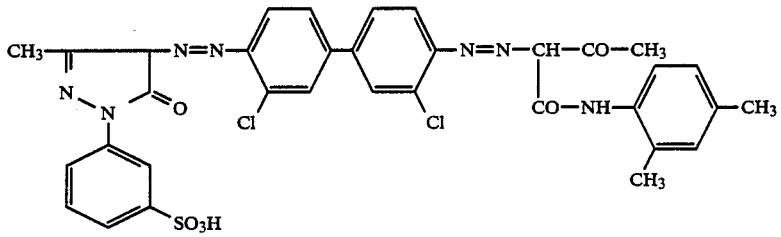

is predominantly formed. The remaining solution 3d is converted to the pigment as described in Use Example 4.

EXAMPLE 4

An aqueous suspension of the asymmetric disazo compound

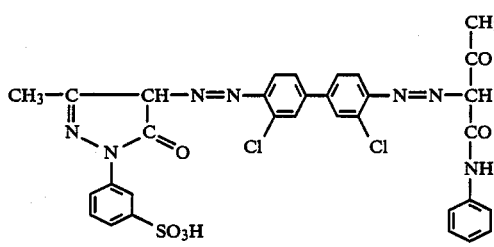

is prepared similarly to the process described in Example 1, 19.5 parts of acetoacetanilide being used instead of 22.6 parts of acetoacet-2,4-dimethylanilide.

EXAMPLES 5 TO 35

The asymmetric disazo compounds stated in the Table were prepared in the form of aqueous suspensions, similarly to Example 1 or 2. 25.32 parts of tetrazotized 4,4'-diamino-3,3'-dichlorodiphenyl (solution a) were coupled to the following components:

| Example | Solution b | Solution d |
|---|---|---|
| 5 | 25.43 parts of 1-(3'-sulfophenyl)-3-methyl-pyrazol-5-one | 21.1 parts of acetoacet-2-methylanilide |
| 6 | 25.43 parts of 1-(3'-sulfophenyl)-3-methyl-pyrazol-5-one | 29.9 parts of acetoacet-2,5-dimethoxy-4-chloro-anilide |
| 7 | 25.43 parts of 1-(3'-sulfophenyl)-3-methyl-pyrazol-5-one | 20.7 parts of 1-(4'-methyl-phenyl)-3-methylpyrazol-5-one |
| 8 | 25.43 parts of 1-(4'-sulfophenyl)-3-methyl-pyrazol-5-one | 19.5 parts of acetoacet-anilide |
| 9 | 25.43 parts of 1-(4'-sulfophenyl)-3-methyl-pyrazol-5-one | 22.6 parts of acetoacet-2,4-dimethylanilide |
| 10 | 25.43 parts of 1-(4'-sulfophenyl)-3-methyl-pyrazol-5-one | 21.1 parts of acetoacet-2-methylanilide |
| 11 | 25.43 parts of 1-(4'-sulfophenyl)-3-methyl-pyrazol-5-one | 20.7 parts of 1-(4'-methyl-phenyl)-3-methylpyrazol-5-one |
| 12 | 28.87 parts of 1-(2'-chloro-4'-sulfophenyl)-3-methylpyrazol-5-one | 19.5 parts of acetoacet-anilide |
| 13 | 28.87 parts of 1-(2'-chloro-4'-sulfophenyl)-3-methylpyrazol-5-one | 22.6 parts of acetoacet-2,4-dimethylanilide |
| 14 | 28.87 parts of 1-(2'-chloro-5'-sulfophenyl)-3-methylpyrazol-5-one | 19.5 parts of acetoacet-anilide |
| 15 | 28.87 parts of 1-(2'-chloro-5'-sulfophenyl)-3-methlypyrazol-5-one | 22.6 parts of acetoacet-2,4 dimethylanilide |
| 16 | 32.31 parts of 1-(2',5'-dichloro-4'-sulfophenyl-3-methylpyrazol-5-one | 19.5 parts of acetoacet-anilide |
| 17 | 32.31 parts of 1-(2',5'-dichloro-4'-sulfophenyl-3-methylpyrazol-5-one | 22.6 parts of acetoacet-2,4-dimethylanilide |
| 18 | 25.73 parts of acetoacet-aminobenzene-4-sulfonic acid | 22.6 parts of acetoacet-2,4-dimethylanilide |
| 19 | 25.73 parts of acetoacet-aminobenzene-4-sulfonic acid | 21.1 parts of acetoacet-2-methylanilide |
| 20 | 25.73 parts of acetoacet-aminobenzene-4-sulfonic acid | 29.9 parts of acetoacet-2,5-dimethoxy-4-chloro-anilide |
| 21 | 25.73 parts of acetoacet-aminobenzene-3-sulfonic acid | 19.5 parts of acetoacet-anilide |
| 22 | 25.73 parts of acetoacet-aminobenzene-3-sulfonic acid | 22.6 parts of acetoacet-2,4-dimethylanilide |
| 23 | 25.73 parts of acetoacet-aminobenzene-3-sulfonic acid | 21.1 parts of acetoacet-2-methylanilide |
| 24 | 27.13 parts of acetoacet-amino-4-methylbenzene-2-sulfonic acid | 20.7 parts of 1-(4'-methyl-phenyl)-3-methylpyrazol-5-one |
| 25 | 27.13 parts of acetoacet-amino-4-methylbenzene-2-sulfonic acid | 22.6 parts of acetoacet-2,4-dimethylanilide |
| 26 | 30.57 parts of acetoacet-amino-4-methyl-5-chloro-benzene-2-sulfonic acid | 20.7 parts of 1-(4'-methyl-phenyl)-3-methylpyrazol-5-one |

-continued

| Example | Solution b | Solution d |
|---|---|---|
| 27 | 30.57 parts of acetoacet-amino-4-methyl-5-chlorobenzene-2-sulfonic acid | 22.6 parts of acetoacet-2,4-dimethylanilide |
| 28 | 30.57 parts of acetoacet-amino-4-chloro-5-methylbenzene-2-sulfonic acid | 20.7 parts of 1-(4'-methylphenyl)-3-methylpyrazol-5-one |
| 29 | 30.57 parts of acetoacet-amino-4-chloro-5-methylbenzene-2-sulfonic acid | 22.6 parts of acetoacet-2,4-dimethylanilide |
| 30 | 22.13 parts of acetoacet-aminobenzene-3-carboxylic acid | 22.6 parts of acetoacet-2,4-dimethylanilide |
| 31 | 22.13 parts of acetoacet-aminobenzene-3-carboxylic acid | 19.5 parts of acetoacet-anilide |
| 32 | 22.13 parts of acetoacet-aminobenzene-3-carboxylic acid | 21.1 parts of acetoacet-2-methylanilide |
| 33 | 22.13 parts of acetoacet-aminobenzene-4-carboxylic acid | 22.6 parts of acetoacet-2,4-dimethylanilide |
| 34 | 22.13 parts of acetoacet-aminobenzene-4-carboxylic acid | 19.5 parts of acetoacet-anilide |
| 35 | 22.13 parts of acetoacet-aminobenzene-4-carboxylic acid | 21.1 parts of acetoacet-2-methylanilide |

EXAMPLES 36–41

24.44 parts of 4,4'-diamino-3,3'-dimethoxydiphenyl are tetrazotized (solution a) and the product is coupled to the coupling components stated in the Table, this being carried out similarly to Example 1. The disazo compounds are isolated from the suspension in a conventional manner.

The resulting suspensions of the disazo compounds can also be used directly as additives.

| Example | Solution b | Solution d |
|---|---|---|
| 36 | 25.43 parts of 1-(3'-sulfophenyl)-3-methylpyrazol-5-one | 19.5 parts of acetoacet-anilide |
| 37 | 25.43 parts of 1-(3'-sulfophenyl)-3-methylpyrazol-5-one | 22.6 parts of acetoacet-2,4-dimethylanilide |
| 38 | 25.43 parts of 1-(4'-sulfophenyl)-3-methylpyrazol-5-one | 19.5 parts of acetoacet-anilide |
| 39 | 25.43 parts of 1-(4'-sulfophenyl)-3-methylpyrazol-5-one | 22.6 parts of acetoacet-2,4-dimethylanilide |
| 40 | 25.73 parts of acetoacet-aminobenzene-4-sulfonic acid | 19.5 parts of acetoacet-anilide |
| 41 | 25.73 parts of acetoacet-aminobenzene-4-sulfonic acid | 22.6 parts of acetoacet-2,4-dimethylanilide |

EXAMPLES 42–48

21.23 parts of 4,4'-diamino-3,3'-dimethyldiphenyl are tetrazotized (solution a) and the product is coupled to the coupling components stated in the Table, these steps being carried out similarly to Example 1. The disazo compounds are isolated from the suspension in a conventional manner.

The resulting suspensions of the disazo compounds can also be used directly as additives.

| Example | Solution b | Solution d |
|---|---|---|
| 42 | 25.43 parts of 1-(3'-sulfophenyl)-3-methylpyrazol-5-one | 22.6 parts of acetoacet-2,4-dimethylanilide |
| 43 | 25.43 parts of 1-(4'-sulfophenyl)-3-methylpyrazol-5-one | 22.6 parts of acetoacet-2,4-dimethylanilide |
| 44 | 25.43 parts of 1-(4'-sulfophenyl)-3-methylpyrazol-5-one | 19.5 parts of acetoacet-anilide |
| 45 | 25.73 parts of acetoacet-aminobenzene-4-sulfonic acid | 19.5 parts of acetoacet-anilide |
| 46 | 25.73 parts of acetoacet-aminobenzene-4-sulfonic acid | 22.6 parts of acetoacet-2,4-dimethylanilide |
| 47 | 25.73 parts of acetoacet-aminobenzene-3-sulfonic acid | 22.6 parts of acetoacet-2,4-dimethylanilide |
| 48 | 25.73 parts of acetoacet-aminobenzene-3-sulfonic acid | 19.5 parts of acetoacet-anilide |

EXAMPLE 49

4,4'-Diamino-3,3',5,5'-tetrachlorodiphenyl→1-(3'-sulfophenyl)-3-methylpyrazol-5-one+acetoacetanilide

Solution 49a 13.8 parts of sodium nitrite are introduced slowly, at 10° C., into 333 parts by volume of concentrated sulfuric acid while stirring, the temperature being kept below 20° C. by cooling. Thereafter, the mixture is heated to 60° C. until a clear solution has formed. The latter is cooled to 20° C., and 32.2 parts of 4,4'-diamino-3,3',5,5'-tetrachlorodiphenyl are added in the course of 20 minutes. The mixture is then heated to 50° C. and stirred for a further 2 hours, the temperature decreasing to 25° C. The solution is poured into 2,400 parts of ice-water, active carbon is added to the resulting tetrazo solution, and the solution is filtered.

Solution 49b 25.43 parts of 1-(3'-sulfophenyl)-3-methylpyrazol-5-one are dissolved in 251 parts by volume of 0.4N sodium hydroxide solution (temperature=20° C.).

Solution 49c 440 parts of sodium hydroxide are dissolved in 2,000 parts of ice-water.

Solution 49d 19.51 parts of acetoacetanilide are dissolved in 291 parts by volume of 0.4N sodium hydroxide solution (temperature=20° C.).

Solution 49b is added dropwise in the course of 20 minutes at from 0° to 5° C. to solution 49a, while stirring. The resulting suspensions containing mineral acid is brought to pH 4 by slowly adding solution 49c. Solution 49d is then added to the reaction mixture in the course of 20 minutes without further cooling, the pH after the addition being 4.5. After about 5% of solution 49d has been added, a sample on filter paper, when tested with β-naphthol, indicates that there is no longer any dissolved tetrazonium salt in the reaction medium.

The suspension is then heated to 50° C. and stirred for a further hour. The resulting product can be isolated from the suspension or used directly for the preparation of pigment formulations.

EXAMPLES 50 TO 60

(a) 32.2 parts of 4,4'-diamino-3,3',5,5'-tetrachlorodiphenyl (Examples 50 to 54) and (b) 32.2 parts of 4,4,-diamino-2,2',5,5-tetrachlorodiphenyl (Examples 55 to 60) are diazotized and the product is coupled to the coupling components stated in the Table, these steps being carried out similarly to Example 49. The disazo compounds are isolated in a conventional manner.

| Example | Solution b | Solution d |
|---|---|---|
| Diazo component (a) | | |
| 50 | 25.43 parts of 1-(3'-sulfophenyl)-3-methyl-pyrazol-5-one | 22.6 parts of acetoacet-2,4-dimethylanilide |
| 51 | 25.43 parts of 1-(4'-sulfophenyl)-3-methyl-pyrazol-5-one | 19.5 parts of acetoacetanilide |
| 52 | 25.43 parts of 1-(4'-sulfophenyl)-3-methyl-pyrazol-5-one | 22.6 parts of acetoacet-2,4-dimethylanilide |
| 53 | 25.73 parts of acetoacet-aminobenzene-4-sulfonic acid | 19.5 parts of acetoacetanilide |
| 54 | 25.73 parts of acetoacet-aminobenzene-4-sulfonic acid | 22.6 parts of acetoacet-2,4-dimethylanilide |
| Diazo component (b) | | |
| 55 | 25.43 parts of 1-(3'-sulfophenyl)-3-methyl-pyrazol-5-one | 19.5 parts of acetoacetanilide |
| 56 | 25.43 parts of 1-(3'-sulfophenyl)-3-methyl-pyrazol-5-one | 22.6 parts of acetoacet-2,4-dimethylanilide |
| 57 | 25.43 parts of 1-(4'-sulfophenyl)-3-methyl pyrazol-5-one | 19.5 parts of acetoacetanilide |
| 58 | 25.43 parts of 1-(4'-sulfophenyl)-3-methyl-pyrazol-5-one | 22.6 parts of acetoacet-2,4-dimethylanilide |
| 59 | 25.73 parts of acetoacet-aminobenzene-4-sulfonic acid | 19.5 parts of acetoacetanilide |
| 60 | 25.73 parts of acetoacet-aminobenzene-4-sulfonic acid | 22.6 parts of acetoacet-2,4-dimethylanilide |

C. Pigment formulations

Use Example 1 (Formulation 1)

(a) Tetrazotization 14 parts of 4,4'-diamino-3,3'-dichlorodiphenyl in 830 parts by volume of 0.4N hydrochloric acid are tetrazotized at 0° C. with 7.7 parts of sodium nitrite. Excess sodium nitrite is removed using amidosulfonic acid.

(b) Coupling 23.2 parts of acetoacet-2,4-dimethylanilide are dissolved in 159 parts by volume of 1.5N sodium hydroxide solution. 151 parts by volume of 0.5N acetic acid are initially taken in the coupling vessel. The coupling component dissolved in the alkaline medium is then added to the acetic acid in an amount such that a pH of 5.0 is obtained.

0.41 part of the disazo compound of Example 9, in the form of the suspension obtained in the synthesis, is added to this mixture.

The tetrazo solution a and the remaining solution of the coupling component are then simultaneously added to the reaction vessel, the pH being kept at 5.0 and the temperature at 20° C. After the addition of all the coupling component, the pH decreases to about 3.5 during the addition of the remaining tetrazo solution.

(c) Working up

When coupling is complete, the pigment suspension is neutralized with 10% strength sodium hydroxide solution, after which a solution of 16.25 parts of a partially hydrogenated rosin (Staybelite ® resin) in 197 parts by volume of 0.3N sodium hydroxide solution. The aqueous suspension is heated at the boil for 15 minutes, after which a solution of 3.62 parts of calcium chloride in 50 parts of water is added, the mixture is kept at the boil for a further 15 minutes, cooled to 80° C. and then brought to pH 8 with dilute hydrochloric acid. The formulation is filtered off, washed with water and dried at 50°-60° C. (formulation 1).

COMPARATIVE EXAMPLE I

Tetrazotization, coupling and aftertreatment are carried out as described under (a), (b) and (c) in Use Example 1, except that the additive prepared according to Example 9 is not added (formulation I).

COMPARATIVE EXAMPLE II

Tetrazotization, coupling and aftertreatment are carried out as described under (a), (b) and (c) in Use Example 1, except that, instead of adding the disazo compound from Example 9 to the coupling component, 0.142 part of 1-(4'-sulfophenyl)-3-methylpyrazol-5-one is added to the solution of the acetoacet-2,4-dimethylanilide, as a component (formulation II).

Assessment of the formulation:

The formulations obtained are tested according to A. According to the visual assessment of the test prints produced from the unheated inks 1, the print obtained employing the formulation of Use Example 1 has substantially higher transparency compared with Comparative Examples I and II. The test prints prepared from the heated inks 2 show a decrease in transparency compared with the corresponding inks 1, this decrease being small in the case of formulation 1 and substantial in the case of Comparative Example I. Comparative visual assessment of the decrease in transparency of the relatively opaque Comparative Example II as compared with the highly transparent formulation 1 is not possible owing to the great differences in the transparencies of these two products.

In addition to high transparency and good heat stability, formulation 1 has advantageous flow behavior, high color strength and good gloss. Measurement of the ink densities using the densitometer:

| | Ink density | | |
|---|---|---|---|
| | Ink 1 | Ink 2 | HSN |
| Formulation 1 | −0.87 | −1.04 | 17 |
| Comparative Example I | −0.99 | −1.29 | 30 |
| Comparative Example II | −1.05 | −1.20 | 15 |

Use Example 2 (Formulation 2)

Tetrazotization of 14 parts of 4,4'-diamino-3,3'-dichlorodiphenyl and coupling with 23.2 parts of acetoacet-2,4-dimethylanilide is carried out similarly to Use Example 1 (a) and (b), except that, instead of the disazo compound of Example 9, 0.41 part of the disazo compound from Example 1, in the form of the suspension obtained in the synthesis, is added to the reaction medium. Treatment with resin, aftertreatment and working up of the pigment suspension are carried out similarly to Use Example 1, (c).

COMPARATIVE EXAMPLE III (FORMULATION III)

Tetrazotization, coupling and aftertreatment are carried out similarly to Use Example 2, except that, instead of the additive prepared as described in Example 1, 0.142 part of 1-(3'-sulfophenyl)-3-methylpyrazol-5-one is added to the solution of acetoacet-2,4-dimethylanilide, as a component.

Formulations 2, I and III are assessed according to A. The color density measurements give the following values:

|  | Ink density | | |
|---|---|---|---|
|  | Ink 1 | Ink 2 | HSN |
| Formulation 2 | −0.90 | −1.06 | 16 |
| Formulation I | −0.99 | −1.29 | 30 |
| Formulation III | −0.96 | −1.19 | 23 |

Visual assessment of the test prints shows that the loss of transparency for ink 2 compared with ink 1 is smaller in the case of formulating 2 than in the case of Comparative Example III. Furthermore, formulation 2 with ink 1 exhibits better transparency than Comparative Example III. Comparative Example I shows the lowest transparency for ink 1, and the greatest decrease in transparency for the three samples evaluated when ink 2 is compared with ink 1.

Use Example 3 (Formulation 3)

Formulation 3 is prepared similarly to Use Example 2, except that, instead of the disazo compound of Example 1, the same amount of the disazo compound of Example 2, in the form of the suspension obtained in the synthesis, is added. The properties of the formulation correspond to those of formulation 2.

Use Example 4 (Formulation 4)

(a) Tetrazotization 12.7 parts of 4,4'-diamino-3,3'-dichlorodiphenyl in 753 parts by volume of 0.4N hydrochloric acid are tetrazotized at 0° C. with 6.93 parts of sodium nitrite. Excess sodium nitrite is removed with amidosulfonic acid.

(b) Coupling

The tetrazo solution (a) and the remaining solution 3d of Example 3 are simultaneously added to the suspension obtained according to Example 3.2, the pH being kept at 5.0 and the temperature at 20° C. After all the coupling component has been added, the pH decreases to about 3.5 during the addition of the remaining tetrazo solution.

Treatment with resin, aftertreatment and working up are carried out by methods similar to those described for formulation 2. The properties of the formulation correspond to those of formulations 2 and 3.

Use Example 5 (Formulation 5)

Tetrazotization of 14 parts of 4,4'-diamino-3,3'-dichlorophenyl and coupling with 23.2 parts of acetoacet-2,4-dimethylanilide are carried out similarly to formulation 1, except that, instead of the additive used in formulation 1, 0.83 part of the disazo compound of Example 1, in the form of the suspension obtained in the synthesis, is added to the reaction mixture.

When coupling is complete, the pigment suspension is neutralized with 10% strength sodium hydroxide solution, after which a solution of 16.25 parts of a partially hydrogenated rosin (Staybelite Resin) in 197 parts by volume of 0.3N sodium hydroxide solution is added. The suspension is heated at the boil for 15 minutes, after which the resin is precipitated at pH 4.5 by adding 10% strength hydrochloric acid. The suspension is kept at the boil for a further 15 minutes and cooled to 60° C., and the product is filtered off, washed thoroughly with water and dried at from 50° to 60° C. The formulation gives a printing ink which produces prints having high transparency and good heat stability (HSN=9).

Use Example 6 (Formulation 6)

Tetrazotization of 14 parts of 4,4'-diamino-3,3'-dichlorodiphenyl and coupling with 23.2 parts of acetoacet-2,4-dimethylanilide are carried out similarly to formulation 1, (a) and (b), except that no additive is introduced into the reaction medium before coupling of the pigment. When coupling is complete, the pigment suspension is neutralized with 10% strength sodium hydroxide solution, after which a solution of 16.25 parts of a partially hydrogenated rosin in 197 parts by volume of 0.3N sodium hydroxide solution is added. The suspension is heated at the boil for 15 minutes. 0.41 part of the disazo compound of Example 1, in the form of the suspension obtained in the synthesis, is then added.

The resin is then precipitated by adding 10% strength hydrochloric acid, and the suspension is kept at the boil for a further 15 minutes.

The formulation is cooled to 60° C. and the product is filtered off, washed thoroughly with water and dried at from 50° to 60° C.

After it has been milled in a letterpress/offset varnish, the pigment gives a very transparent ink whose high transparency decreases only slightly, even on heating at 100° C.

Use Example 7 (Formulation 7)

The synthesis and aftertreatment of the pigment formulation are carried out similarly to formulation 1, except that, instead of the disazo compound of Example 9, 0.83 part of the disazo compound of Example 18, in the form of the suspension obtained in the synthesis, is added to the reaction medium.

The pigment can be used to prepare a very transparent offset ink which has very high heat stability and differs from the ink prepared from formulation 1 in that it has a greenish hue.

|  | Ink density | | |
|---|---|---|---|
|  | Ink 1 | Ink 2 | HSN |
| Formulation 7 | −0.91 | −0.98 | 7 |

Use Example 8 (Formulation 8)

The synthesis and aftertreatment of the pigment formulation are carried out similarly to formulation 7, except that the resin is precipitated not in the form of the calcium soap, as in formulation 7, but as the zinc soap. For this purpose, a solution of 8.62 parts of zinc sulfate. 7 $H_2O$ in 50 parts of water is added to the suspension, instead of the calcium chloride. The suspension is then kept at the boil for a further 15 minutes and then cooled to 80° C. and brought to pH 6 with dilute hydrochloric acid. Working up is carried out similarly to formulation 7.

The resulting pigment formulation can be converted to a transparent offset ink having a high heat stability.

Use Example 9 (Formulation 9)

The synthesis and aftertreatment of the pigment formulation are carried out similarly to formulation 1, except that, instead of the disazo compound of Example 9, 0.83 part of the disazo compound of Example 22, in the form of the suspension obtained in the synthesis, is added to the reaction medium.

The formulation can be used to produce a transparent and heat-stable printing ink having a greenish yellow hue, the method used being similar to that for formulation 7.

Use Example 10 (Formulation 10)

(a) Tetrazotization 14 parts of 4,4'-diamino-3,3'-dichlorodiphenyl are tetrazotized similarly to Use Example 1, (a). (b1) Coupling on one side with 1-(3'-sulfophenyl)-3-methylpyrazol-5-one.

0.28 part of 1-(3'-sulfophenyl)-3-methylpyrazol-5-one, dissolved in 12 parts by volume of 0.1N sodium hydroxide solution, is added in the course of about 10 minutes to 2% of the tetrazo solution from (a). The resulting suspension containing mineral acid is buffered to pH 4 with sodium acetate.

(b2) Coupling of the pigment 23 parts of acetoacet-2,4-dimethylanilide are dissolved in 157 parts by volume of 1.5N sodium hydroxide solution. 150 parts by volume of 0.5N acetic acid are initially taken in the coupling vessel. The coupling component dissolved in the alkaline medium is then added to the acetic acid in an amount sufficient to bring the pH to 5.0. The suspension obtained according to (b1) is then added.

Coupling, aftertreatment and working up are carried out similarly to Use Example 1, (c), except that, instead of 16.25 parts, 15.93 parts of the partially hydrogenated rosin, dissolved in 193 parts by volume of 0.3N sodium hydroxide solution, are added.

In a letterpress/offset print, formulation 10 has very good transparency and heat stability.

Use Example 11 (Formulation 11)

The pigment synthesis is carried out similarly to formulation 1, except that, instead of 23.2 parts of acetoacet-2,4-dimethylanilide, 20 parts of acetoacetanilide are added to the reaction medium as the coupling component, and, instead of the disazo compound of Example 9, 1.63 parts of the disazo compound of Example 8, in the form of the suspension obtained in the synthesis, are introduced into the reaction medium.

When coupling is complete, the pigment suspension is neutralized with 10% strength sodium hydroxide solution, after which a solution of 14.92 parts of partially hydrogenated rosin in 181 parts by volume of 0.3N sodium hydroxide solution is added. The suspension is heated at the boil for 15 minutes, after which the resin is precipitated by adding 3.42 parts of calcium chloride dissolved in 50 parts of water, the suspension is kept at the boil for a further 15 minutes, cooled to 80° C. and then brought to pH 8 with dilute hydrochloric acid.

The formulation is filtered off, washed with water and dried at from 50° to 60° C.

The pigment can be used to prepare a reddish yellow offset ink having extremely high transparency and heat stability.

Testing a test print according to A gives the following values:

|  | Ink density | | |
|---|---|---|---|
|  | Ink 1 | Ink 2 | HSN |
| Formulation 11 | −0.71 | −0.79 | 8 |

Use Example 12 (Formulation 12)

The pigment synthesis is carried out similarly to formulation 11, except that, instead of 1.63 parts, 1.21 parts of the disazo compound of Example 8, in the form of the suspension obtained in the synthesis, are added to the reaction mixture.

When coupling is complete, the pigment suspension is neutralized with 10% strength sodium hydroxide solution after which a solution of 14.92 parts of balsam resin in 181 parts by volume of 0.3N sodium hydroxide solution is added. The suspension is heated at the boil for 15 minutes, the resin is then precipitated at pH 4.5 by adding 10% strength hydrochloric acid, and the suspension is kept at the boil for a further 15 minutes.

The formulation is filtered off, washed with water and dried at from 50° to 60° C. In offset printing inks, the formulation has advantages similar to those obtained with formulation 11.

Use Example 13 (Formulation 13)

The synthesis, aftertreatment and working up correspond to those for formulation 11, except that, instead of 0.63 parts, 0.8 part of the disazo compound of Example 8, in the form of the suspension obtained in the synthesis, is added to the reaction medium and in the resin treatment, instead of 14.92 parts, only 6.14 parts of the partially hydrogenated rosin, dissolved in 75 parts by volume of 0.3N sodium hydroxide solution, are added to the neutralized pigment suspension. To precipitate the resin, 1.42 parts of calcium chloride dissolved in 20 parts of water are required, instead of 3.42 parts.

In an offset printing ink, the pigment has good transparency and excellent heat stability and has a more greenish hue and is somewhat less transparent compared with formulation 11.

Use Example 14 (Formulation 14)

The synthesis, aftertreatment and working up correspond to those for formulation 11, except that, instead of the disazo compound obtained according to Example 8, 1.63 parts of the disazo compound of Example 4, in the form of the suspension obtained in the synthesis, are added to the reaction medium.

In offset printing, the formulation has advantages similar to those obtained with formulation 11:

|  | Ink density | | |
|---|---|---|---|
|  | Ink 1 | Ink 2 | HSN |
| Formulation 14 | −0.81 | −0.87 | 6 |

Use Example 15 (Formulation 15)

The synthesis, aftertreatment and working up correspond to those for formulation 12, except that, instead of 1.21 parts of the disazo compound of Example 8, 0.8 part of the disazo compound of Example 21, in the form of the suspension obtained in the synthesis, is added to the reaction medium. Moreover, partially hydrogenated rosin is used instead of the balsam resin.

In offset inks, the resulting pigment has high transparency and heat stability and possesses a substantially greener hue compared with formulation 12.

Use Example 16 (Formulation 16)

The pigment synthesis is carried out similarly to formulation 1, except that, instead of 23.2 parts of acetoacet-2,4-dimethylanilide, 21.6 parts of acetoacet-2-methylanilide are added to the reaction medium as the coupling component, and, instead of the disazo compound of Example 9, 0.4 part of the disazo compound of Example 5, in the form of the suspension obtained in the synthesis, is introduced into the reaction medium.

When coupling is complete, the pigment suspension is neutralized with 10% strength sodium hydroxide solution, after which a solution of 15.58 parts of a partially hydrogenated rosin in 189 parts by volume of 0.3N sodium hydroxide solution is added. The suspension is heated at the boil for 15 minutes, after which the resin is precipitated at pH 4.5 by adding 10% strength hydrochloric acid and the suspension is kept at the boil for a further 15 minutes. The formulation is filtered off, washed thoroughly with water and dried at from 50° to 60° C.

In an offset ink, the pigment has high transparency and heat stability.

Use Example 17 (Formulation 17)

The synthesis of the pigment is carried out similarly to formulation 16, except that, instead of the disazo compound of Example 5, 0.4 part of the disazo compound of Example 10, in the form of the suspension obtained in the synthesis, is added to the reaction medium.

Resin treatment and aftertreatment differ from those for formulation 16 in that the resin is precipitated by adding 3.48 parts of calcium chloride, dissolved in 50 parts of water, to the boiling suspension. Thereafter, the mixture is kept at the boil for a further 15 minutes, cooled to 80° C. and then brought to pH 8 with dilute hydrochloric acid. Working up is carried out similarly to formulation 16.

In an offset printing ink, the formulation has excellent transparency and good heat stability.

|  | Ink density | | |
| --- | --- | --- | --- |
|  | Ink 1 | Ink 2 | HSN |
| Formulation 17 | −0.86 | −1.02 | 16 |

Use Example 18 (Formulation 18)

The synthesis, aftertreatment and working up of the pigment are carried out similarly to formulation 17, except that, instead of the disazo compound of Example 10, 0.82 part of the disazo compound of Example 23, in the form of the suspension obtained in the synthesis, is added to the reaction medium.

In offset printing, the formulation has high transparency and heat stability but differs from formulation 17 by having a more greenish hue.

Use Example 19 (Formulation 19)

The synthesis, aftertreatment and working up of the pigment are carried out similarly to formulation 16, except that, instead of the disazo compound of Example 5, 0.82 part of the disazo compound of Example 19, in the form of the suspension obtained in the synthesis, is added to the reaction medium.

In offset printing, the formulation has high transparency and heat stability and possesses a hue similar to that of formulation 18.

Use Example 20 (Formulation 20)

The pigment synthesis is carried out similarly to formulation 1, except that, instead of 23.2 parts of acetoacet-2,4-dimethylanilide, a mixture of 22.04 parts of acetoacet-2,4-dimethylanilide and 1.17 parts of acetoacet-2-methoxyanilide is used as the coupling component. Resin treatment, aftertreatment and working up are carried out as for formulation 5. In an offset printing ink, the pigment has high transparency and good heat stability.

Use Example 21 (Formulation 21)

The pigment synthesis is carried out similarly to formulation 1, except that, instead of 23.2 parts of acetoacet-2,4-dimethylanilide, 30.70 parts of acetoacet-2,5-dimethoxy-4-chloroanilide are added to the reaction medium as the coupling component, and, instead of 0.41 part of the disazo compound of Example 9, 0.45 part of the disazo compound of Example 6, in the form of the suspension obtained in the synthesis, is introduced into the reaction medium.

Resin treatment, aftertreatment and working up are carried out similarly to formulation 5, except that, instead of the partially hydrogenated rosin, 2.38 parts of balsam resin, dissolved in 29 parts by volume of 0.3N sodium hydroxide solution, are used.

In offset printing, the formulation has good transparency and heat stability.

Use Example 22 (Formulation 22)

The synthesis, aftertreatment and working up are carried out similarly to formulation 21, except that, instead of 0.45 part of the disazo compound of Example 6, 1.85 parts of the disazo compound of Example 20, in the form of the suspension obtained in the synthesis, are added to the reaction medium.

In offset printing, the formulation has properties similar to those of formulation 21.

Use Example 23 (Formulation 23)

(a) Tetrazotization 14 parts of 4,4'-diamino-3,3'-dichlorodiphenyl are tetrazotized similarly to Use Example 1a. 14.75 parts of sodium acetate.3 H$_2$O and 1.2 parts of an emulsifier (oleic acid ethoxylated with 5 units of ethylene oxide) are added to the solution. Before the beginning of coupling, 0.4 part of the disazo compound of Example 7, in the form of the suspension obtained in the synthesis, is stirred into the tetrazo solution.

(b) Coupling 21.60 parts of 1-(4'-methylphenyl)-3-methylpyrazol-5-one are dissolved in 600 parts by volume of 0.2N sodium hydroxide solution at 20° C.

The tetrazo solution (a) is initially taken in the coupling vessel, and the coupling component dissolved in the alkaline medium is added in the course of 30 minutes. When coupling is complete, the pH is 4 and the temperature 10° C. The suspension is carefully heated to 40° C. At this temperature, excess tetrazo solution is no longer detectable. The mixture is then heated to the boil, and boiling is continued for 20 minutes.

The formulation is filtered off, washed with water and dried at from 50° to 60° C.

The formulation thus obtained has higher transparency and better heat stability than a similar pigment prepared without an additive.

Use Example 24 (Formulation 24)

13.51 parts of 4,4'-diamino-3,3'-dimethoxydiphenyl are coupled to 20.0 parts of acetoacetanilide, 0.39 part of the disazo compound of Example 38, in the form of the suspension obtained in the synthesis, being added. Tetrazotization, coupling and the introduction of the additive are carried out similarly to Use Example 1, (a) and 1, (b). When coupling is complete, the pigment suspension is heated to 100° C. and kept at the boil for 15 minutes. The suspension is then filtered and the product is washed with water and dried at from 50° to 60° C.

The formulation thus obtained has higher transparency and better heat stability than a similar pigment prepared without an additive.

Use Example 25 (Formulation 25)

The synthesis and aftertreatment of the pigment formulation are carried out similarly to formulation 1, except that, instead of the disazo compound of Example 9, 0.91 part of the disazo compound of Example 17, in the form of the suspension obtained in the synthesis, is added to the reaction medium. The formulation can be used to prepare a highly transparent, heat-stable printing ink which has high color strength and a more greenish hue than formulation 1.

Use Examples 26 and 27 (Formulations 26 and 27)

The synthesis and aftertreatment of the pigment formulations 26 and 27 are carried out similarly to formulation 5, except that, instead of the disazo compound of Example 1, 0.89 part of the disazo compound of Example 29 (formulation 26) or 0.89 part of the disazo compound of Example 27 (formulation 27), in the form of the suspension obtained in the synthesis, is added to the reaction medium.

The formulations give transparent and heat-stable printing inks which have a more greenish hue than formulation 5.

Use Examples 28 and 29 (Formulation 28 and 29)

The synthesis and aftertreatment of the pigment formulations 28 and 29 are carried out similarly to formulation 1, except that, instead of the disazo compound of Example 9, 0.91 part of the disazo compound of Example 50 (formulation 28) or 0.91 part of the disazo compound of Example 52 (formulation 29), in the form of the suspension obtained in the synthesis, is added to the reaction medium. The formulations are used to prepare highly transparent and heat-stable printing inks which give very deep prints having a greenish yellow hue.

|  | Ink density | | |
|---|---|---|---|
|  | Ink 1 | Ink 2 | HSN |
| Formulation 28 | −0.42 | −0.51 | 9 |
| Formulation 29 | −0.36 | −0.44 | 8 |

Use Example 30 (Formulation 30)

The synthesis and aftertreatment of the pigment formulation are carried out similarly to formulation 5, except that, instead of the disazo compound of Example 1, 0.91 part of the disazo compound of Example 56, in the form of the suspension obtained in the synthesis, is added to the reaction medium.

Formulation 30 is converted to a printing ink which has similar properties to the printing inks obtained from formulations 28 and 29 but a more greenish hue.

Use Examples 31 and 32 (Formulations 31 and 32)

The synthesis and aftertreatment of pigment formulations 31 and 32 are carried out similarly to formulation 11, except that, instead of the disazo compound of Example 8, 0.84 part of the disazo compound of Example 12 (formulation 31) or 0.41 part of the disazo compound of Example 14 (formulation 32), in the form of the suspension obtained in the synthesis, is added to the reaction medium.

The formulations can be used to prepare heat-stable printing inks which have high color strength and give deep prints having very high transparency.

Use Example 33 and 34 (Formulations 33 and 34)

The synthesis and aftertreatment of the pigment formulations 33 and 34 are carried out similarly to formulation 11, except that, instead of the disazo compound of Example 8, 1.69 parts of the disazo compound of Example 24 (formulation 33) or 1.79 parts of the disazo compound of Example 51 (formulation 34), in the form of the suspension obtained in the synthesis, are added to the reaction medium.

The formulations can be used to prepare transparent and heat-stable printing inks, formulation 34 giving prints which have a more greenish hue compared with formulation 33.

|  | Ink density | | |
|---|---|---|---|
|  | Ink 1 | Ink 2 | HSN |
| Formulation 33 | −0.48 | −0.53 | 5 |
| Formulation 34 | −0.53 | −0.62 | 9 |

We claim:

1. A mixture of disazo compounds based on 4,4'-diaminodiphenyl compounds, which contains not less than 50% by weight of a disazo compound of the formula $$A-N=N-Z-N=N-B$$

where Z is

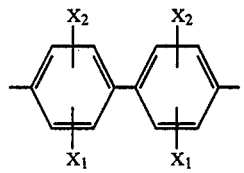

where $X_1$ and $X_2$ independently of one another are each hydrogen, chlorine, bromine, methoxy or methyl and are arranged symmetrically, A is a radical of a coupling component

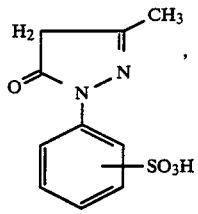

where the benzene radical is not further substituted or is additionally monosubstituted or disubstituted by chlorine, methyl or methoxy, and B is a radical of a coupling component

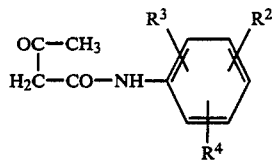

where $R^2$, $R^3$ and $R^4$ independently of one another are each hydrogen, methyl, methoxy or chlorine.

2. A mixture of disazo compounds as claimed in claim 1, which contains not less than 80% by weight of (I).

3. A mixture of disazo compounds as claimed in claim 1, wherein Z is 4,4'-(3,3'-dichlorodiphenylene), 4,4'-(3,3'-dimethoxydiphenylene), 4,4'-(3,3'-dimethyldiphenylene), 4,4'-(3,3',5,5'-tetrachlorodiphenylene) or 4,4'-(2,2',5,5'-tetrachlorodiphenylene).

4. A mixture of disazo compounds as claimed in claim 2, wherein Z is 4,4'-(3,3'-dichlorodiphenylene), 4,4'-(3,3'-dimethoxydiphenylene), 4,4'-(3,3'-dimethyldiphenylene), 4,4'-(3,3',5,5'-tetrachlorodiphenylene) or 4,4'-(2,2',5,5'-tetrachlorodiphenylene).

5. A mixture of disazo compounds as claimed in claim 1, wherein Z is 4,4'-(3,3'-dichlorodiphenylene).

6. A mixture of disazo compounds as claimed in claim 2, wherein Z is 4,4'-(3,3'-dichlorodiphenylene).

7. A mixture of disazo compounds as claimed in claim 3, wherein A is derived from 1-(3'-sulfophenyl)-3-methylpyrazol-5-one, 1-(4'-sulfophenyl)-3-methylpyrazol-5-one, 1-(2'-chloro-4'-sulfophenyl)-3-methylpyrazol-5-one, 1-(2'-chloro-5'-sulfophenyl)-3-methylpyrazol-5-one, or 1-(2',5'-dichloro-4'-sulfophenyl)-3-methylpyrazol-5-one.

8. A mixture of disazo compounds as claimed in claim 4, wherein A is derived from 1-(3'-sulfophenyl)-3-methylpyrazol-5-one, 1-(4'-sulfophenyl)-3-methylpyrazol-5-one, 1-(2'-chloro-4'-sulfophenyl)-3-methylpyrazol-5-one, 1-(2'-chloro-5'-sulfophenyl)-3-methylpyrazol-5-one, or 1-(2',5'-dichloro-4'-sulfophenyl)-3-methylpyrazol-5-one, acetoacetaminobenzene.

9. A mixture of disazo compounds as claimed in claim 3, wherein A is a radical of 1-(3'-sulfophenyl)-3-methylpyrazol-5-one, or of 1-(4'-sulfophenyl)-3-methylpyrazol-5-one.

10. A mixture of disazo compounds as claimed in claim 4, wherein A is a radical of 1-(3'-sulfophenyl)-3-methylpyrazol-5-one, or of 1-(4'-sulfophenyl)-3-methylpyrazol-5-one.

11. A mixture of disazo compounds as claimed in claim 5, wherein A is a radical of 1-(3'-sulfophenyl)-3-methylpyrazol-5-one, or of 1-(4'-sulfophenyl)-3-methylpyrazol-5-one.

12. A mixture of disazo compounds as claimed in claim 3, wherein B is derived from acetoacetanilide, acetoaceto-toluidide, acetoacetamino-2,4-dimethylbenzene, acetoacetamino-2,5-dimethoxy-4-chlorobenzene, or acetoacetamino-2-methoxybenzene.

13. A mixture of disazo compounds as claimed in claim 4, wherein B is derived from acetoacetanilide, acetoaceto-toluidide, acetoacetamino-2,4-dimethylbenzene, or acetoacetamino-2,5-dimethoxy-4-chlorobenzene, acetoacetamino-2-methoxybenzene.

14. A mixture of disazo compounds as claimed in claim 3, wherein B is a radical of an acetoacetanilide of the formula

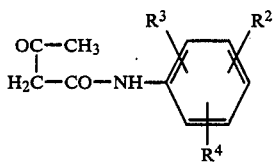

where $R^2$, $R^3$ and $R^4$ independently of one another are each hydrogen, methyl, methoxy or chlorine.

15. A mixture of disazo compounds as claimed in claim 6, wherein B is a radical of an acetoacetanilide of the formula

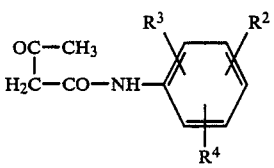

where $R^2$, $R^3$ and $R^4$ independently of one another are each hydrogen, methyl, methoxy or chlorine.

16. A mixture of disazo compounds as claimed in claim 7, wherein B is a radical of an acetoacetanilide of the formula

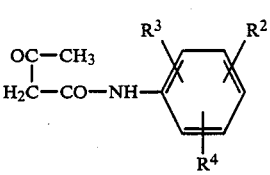

where $R^2$, $R^3$ and $R^4$ independently of one another are each hydrogen, methyl, methoxy or chlorine.

17. A mixture of disazo compounds based on 4,4'-diaminodiphenyl compounds, which contains not less than 50% by weight of a disazo compound of the formula $$A-N=N-Z-N=N-B \qquad (I)$$

where Z is 4,4'-(3,3'-dichlorodiphenylene), 4,4'-(3,3'-dimethoxydiphenylene), 4,4'-(3,3'-dimethyldiphenylene), 4,4'-(3,3',5,5'-tetrachlorodiphenylene) or 4,4'-(2,2',5,5'-tetrachlorodiphenylene), A is a radical of 1-(3'-sulfophenyl)-3-methylpyrazol-5-one, or of 1-(4'-sulfophenyl)-3-methylpyrazol-5-one, and B is a radical of an acetoacetanilide of the formula

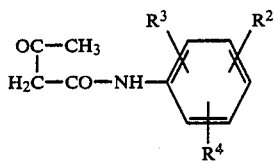

where $R^2$, $R^3$ and $R^4$ independently of one another are each hydrogen, methyl, methoxy or chlorine.

18. A mixture of disazo compounds as claimed in claim 17, wherein Z is 4,4'-(3,3'-dichlorodiphenylene).

19. A mixture of disazo compounds as claimed in claim 18, which contains not less than 80% by weight of (I).

20. A mixture of disazo compounds as claimed in claim 17, wherein B is a radical of acetoacetanilide, acetoaceto-toluidide, acetoacetamino-2,4-dimethylbenzene, acetoacetamino-2,5-dimethoxy-4-chlorobenzene or acetoacetamino-2-methylbenzene.

21. A mixture of disazo compounds as claimed in claim 18, wherein B is a radical of acetoacetanilide, acetoaceto-toluidide, acetoacetamino-2,4-dimethylbenzene, acetoacetamino-2,5-dimethoxy-4-chlorobenzene or acetoacetamino-2-methylbenzene.

22. A mixture of disazo compounds as claimed in claim 19, wherein B is a radical of acetoacetanilide, acetoaceto-toluidide, acetoacetamino-2,4-dimethylbenzene, acetoacetamino-2,5-dimethoxy-4-chlorobenzene or acetoacetamino-2-methylbenzene.

* * * * *